United States Patent [19]
Rupnick et al.

[11] Patent Number: 5,600,067
[45] Date of Patent: Feb. 4, 1997

[54] TORQUE WIRE THERMAL STRAIN RELIEF

[75] Inventors: Charles J. Rupnick, Olympia; Thomas E. Terry, Vashon, both of Wash.

[73] Assignee: AlliedSignal, Inc., Morristown, N.J.

[21] Appl. No.: 447,971

[22] Filed: May 23, 1995

Related U.S. Application Data

[63] Continuation of Ser. No. 108,332, Aug. 18, 1993, abandoned.

[51] Int. Cl.[6] .............................. G01P 15/08; G01P 15/13
[52] U.S. Cl. ........................... 73/514.23; 73/514.36
[58] Field of Search ............... 73/514.23, 514.31, 73/514.36, 514.37, 514.38, 514.21, 497, 514.32

[56] References Cited

U.S. PATENT DOCUMENTS

| | | | |
|---|---|---|---|
| 3,498,138 | 3/1970 | Stewart | 73/514.23 |
| 3,513,711 | 5/1970 | Rogall et al. | 73/514.23 |
| 3,702,073 | 11/1972 | Jacobs | 73/514.23 |
| 4,592,234 | 6/1986 | Norling | 73/517 B |
| 4,697,455 | 10/1987 | Norling | 73/497 |
| 4,955,233 | 9/1990 | Hanson | 73/497 |
| 5,024,089 | 6/1991 | Norling | 73/497 |
| 5,072,619 | 12/1991 | Hanson | 73/517 B |
| 5,111,694 | 5/1992 | Foote | 73/517 B |

Primary Examiner—Hezron E. Williams
Assistant Examiner—Helen C. Kwok

[57] ABSTRACT

A method and apparatus for relieving thermal stress on the flexures of an accelerometer, particularly a quartz accelerometer, caused by the difference in the coefficient of expansion of a bonding adhesive or a sealant placed over a bonding pad to protect or attach the ends of the torque coil and the coefficient of expansion of the quartz. The strain is relieved by supporting the bonding pads on flexible attachments to prevent thermal stress from being transferred into the pendulum and flexures.

6 Claims, 1 Drawing Sheet

TORQUE WIRE THERMAL STRAIN RELIEF

This application is a continuation of application Ser. No. 08/108,332 filed Aug. 18, 1993, now abandoned.

BACKGROUND OF THE INVENTION

1. Field of the Invention

This invention relates generally to systems for mechanically isolating two interconnected bodies and, more particularly to electrically interconnected bodies such as the pendulum and support member of an accelerometer, particularly a quartz accelerometer.

2. Description of the Prior Art

Various means for electrically interconnecting mechanically interconnected bodies, particularly in accelerometers, are known. Examples of such interconnecting systems are disclosed in U.S. Pat. Nos. 4,182,187; 4,250,757; 4,766,768; 4,932,258 and 5,024,089, incorporated herein by reference. However, in such systems, the differences in the thermal coefficients of expansion between a sealant placed on the ends of the interconnecting lead wires and the mounting pads on the device can cause thermally-induced bias and hysteresis errors. In addition, the interconnecting wires themselves, because of their stiffness and because of the difference in thermal coefficients of expansion between the wires, the device may also cause thermally-induced bias and hysteresis errors.

SUMMARY

Accordingly, it is an object of the present invention to provide a system for mechanically isolating two electrically interconnected bodies.

It is another object of the present invention to provide a system for reducing thermally-induced stress on two electrically interconnected bodies.

It is yet another object of the present invention to provide an accelerometer having improved thermal characteristics over the prior art accelerometers.

It is yet another object of the present invention to provide an accelerometer that has improved thermal performance in its bias and hysteresis characteristics.

It is another object of the present invention to provide an accelerometer that has reduced thermal stresses induced into the pendulum and flexures.

Thus, in accordance with an important aspect of the invention, the interconnection between two electrically interconnected members such as a pendulum and support member of an accelerometer is provided by utilizing a pair of bonding pads on one of the members such as the pendulum of an accelerometer to which wires connecting an electrical circuit such as a torque coil of the pendulum of an accelerometer are bonded. The bonding pads are connected to the second member such as a support member of the accelerometer via plated conductors, for example gold conductors. To provide isolation between the bonding pads and the two members to which they are electrically interconnected, slots are formed around each of the bonding pads so that the bonding pads are supported by a flexible member. Consequently, any stresses induced in the bonding pads, for example by differences in the coefficients of expansion of any sealant placed over the bonding pads and the substrate on which the bonding pads are formed is isolated to the area of the bonding pads. Also, any stresses induced by the stiffness of the wires bonded to the bonding pads or the deposited conductors or by any thermal stresses resulting in differences of the coefficients of expansion of the wires, conductors and substrate are isolated to the area of the bonding pads and not transferred to either of the members.

BRIEF DESCRIPTION OF THE DRAWING

These and other objects and advantages of the present invention will become readily apparent upon consideration of the following detailed description and attached drawing, wherein.

DETAILED DESCRIPTION OF THE PREFERRED EMBODIMENT

Figure 1:
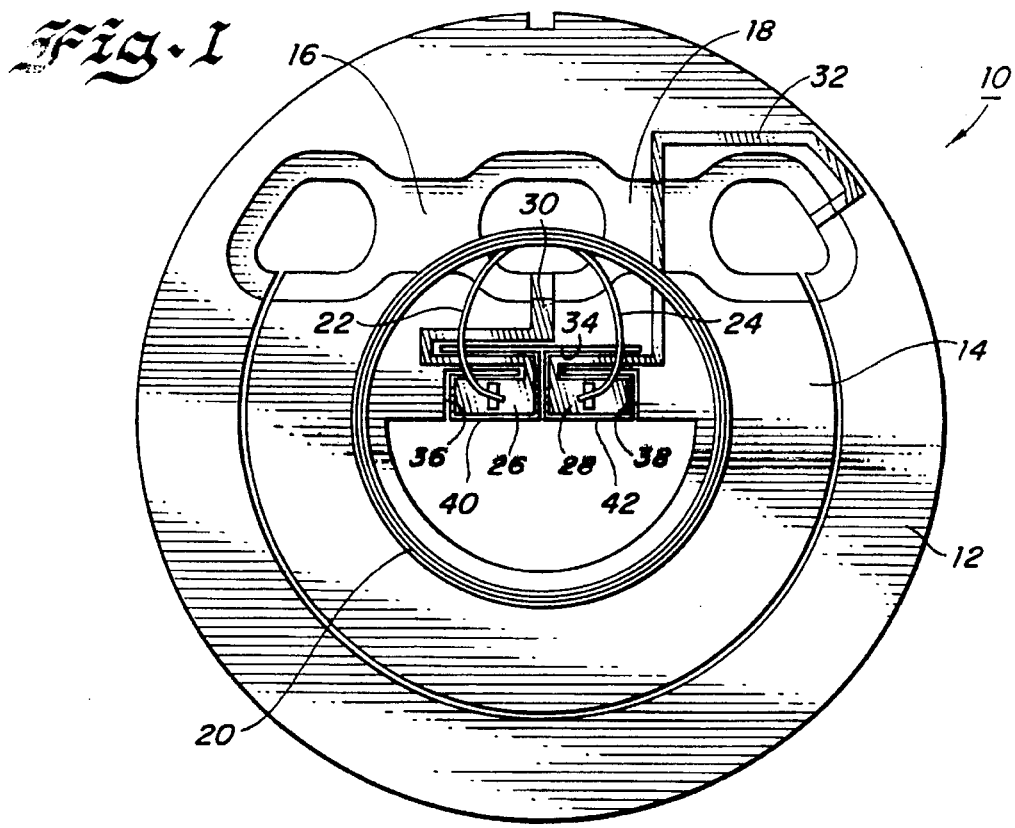
FIG. 1 is a plan view of a quartz accelerometer proof mass assembly.

Referring now to the drawing with particular attention to FIG. 1, there is shown a proof mass assembly according to the invention generally designated by the reference numeral 10. The proof mass 10 is designed for use in an accelerometer, but it should be understood that the invention has other applications. The proof mass assembly 10 shown in FIG. 1 is fabricated from a unitary piece of quartz, but it should be understood that other materials may also be used.

The proof mass assembly 10 comprises a quartz support hoop 12 and a pendulum 14 that is affixed to the support hoop 12 by a pair of flexures 16 and 18. A torque coil 20 is disposed on the pendulum 14. The torque coil 20 is connected in a feedback loop and serves to restore the pendulum 14 to a neutral position when it is deflected by an acceleration force. The operation of a force restoring accelerometer is described in the aforementioned U.S. Pat. Nos. 4,182,187; 4,250,757; 4,766,768; 4,932,258 and 5,024,089.

Electrical connections to the torque coil 20 are made by a pair of wires 22 and 24 that are bonded to a pair of bonding pads 26 and 28. Preferably, the bonding pads 26 and 28 are fabricated from gold and have a pair of deposited gold traces 30 and 32 connected thereto to permit external circuitry to be connected to the bonding pads 26 and 28.

Typically, the wires 22 and 24 which form the ends of the coil 20 are insulated and the ends thereof are stripped to permit them to be bonded to the bonding pads 26 and 28. Conventional semiconductor bonding techniques may be used to make the bond. However, when the ends of the wires 22 and 24, which are typically copper wire, are stripped, they are subject to corrosion, particularly when the accelerometer is used in a corrosive environment. Accordingly, after bonding, a sealant is placed over the bonding pads 26 and 28 and the stripped ends of the wires 22 and 24.

In order to assure that the ends of the lead wires 22 and 24 are completely coated, a low viscosity sealant is used. Unfortunately, the sealant tends to flow onto the pendulum and other portions of the quartz blank used to fabricate the proof mass assembly. Because the sealant has a different coefficient of expansion than the quartz used to fabricate the proof mass assembly, the performance of the accelerometer will vary as a function of temperature. More specifically, the presence of sealant on the pendulum and on the flexures will result in increased thermal hysteresis and cause a thermally-induced bias into the accelerometer.

Figure 2:
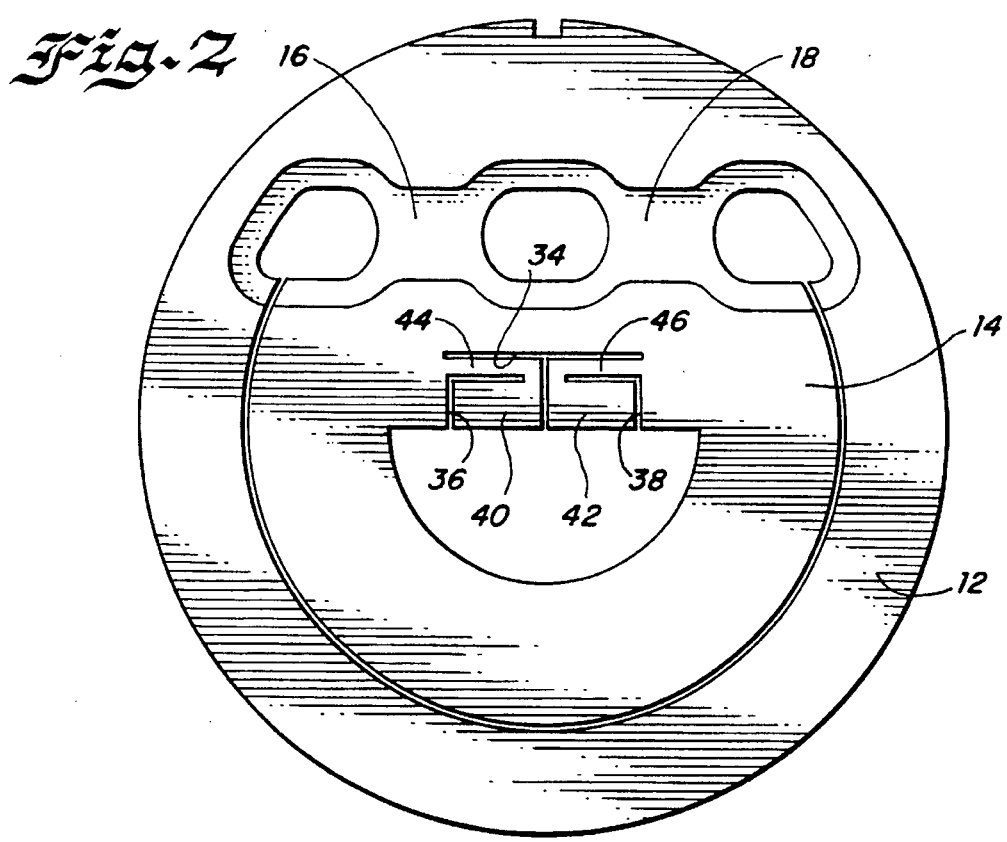
FIG. 2 is a plan view of the quartz reed of the proof mass assembly showing the isolated bonding pads according to the invention.

Therefore, in accordance with an important aspect of the invention, the bonding pads 26 and 28 are mechanically isolated from the pendulum 14, the flexures 16 and 18 and the support hoop 12. This is accomplished by cutting a T-shaped slot 34 and a pair of L-shaped slots 36 and 38 through the pendulum 14 to isolate the bonding pads 26 and 28 on a pair of islands 40 and 42 (FIG. 2). The slots result in the islands 40 and 42 and the pads 26 and 28 being flexibly supported by a pair of flexible quartz arms 44 and 46. The flexible quartz arms 46 and 44 serve to seismically isolate the islands 40 and 42 from the pendulum 14 to reduce any thermally induced bias caused by the differences in coefficients of expansion of the sealant and the quartz. In addition, the slots 34, 36 and 38 serve to isolate the islands 40 and 42 so that sealant applied to the bonding pads 26 and 28 is less likely to travel beyond the islands 40 and 42 onto the pendulum 14 or the flexures 16 and 18. Thus, the sealant is contained essentially to the area of the islands 40 and 42 and any thermal stress caused by the sealant on the islands 40 and 42 is isolated from the pendulum 14 by the flexible arms 44 and 46. The effects of any sealant wicking up to the flexures 16 and 18 or onto the pendulum 14 are virtually eliminated.

While the present invention has been described in the environment of an accelerometer, it should be understood that the invention is applicable to any system requiring the mechanical isolation of two electrically interconnected masses. In addition, it is not intended that the invention be limited to a device requiring a sealant having a coefficient of expansion different than that of the base material, but also may be used in conjunction with any system interconnected by wires because the wires alone may create stresses due to tension in the wires, stiffness of the wires or differences in coefficients of thermal expansion between the wires and the device to which they are connected. It also is useful in any application wherein deposited lead wires such as the gold lead wires 30 and 32 from a body so that thermal expansion of the gold is not transferred to the isolated body. Thus, any stresses caused by the tension, stiffness or relative coefficients of thermal expansion between the quartz and the deposited gold wires are not transferred.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An accelerometer comprising:

a fixed support structure;

a movable pendulum formed with a pendulum portion and one or more bonding portions, said pendulum portion movably attached to said fixed support structure, one or more flexure for movably coupling said fixed support structure to said movable pendulum to rotate about said fixed support structure, where in said bonding portions are formed as islands on said pendulum portion by way of one or more flexible arms, said flexible arms and said bonding portions spaced away from said flexures, said islands adapted to enable rigid attachment of one or more electrical conductors thereto while providing mechanical isolation relative to said movable pendulum and said fixed support structure;

a coil of wire formed from an electrical conductor having two free ends, said two free ends adapted to be rigidly attached to said one or more bonding portions;

electrical connection means making an electrical connection between at least one of said two free ends of said coil of wire and said one or more bonding portions, said electrical connection means including a bonding pad disposed on said one or more bonding portions, said bonding portions disposed on said pendulum, at least one of said two free ends of said coil of wire being rigidly attached to said bonding pad; and means, coupled to said coil of wire, for providing a signal representative of acceleration.

2. An accelerometer as recited in claim 1, wherein said islands are formed by a slot at least partially disposed around said one or more bonding portions.

3. An accelerometer as recited in claim 2, wherein said support structure and said pendulum are fabricated from quartz.

4. An accelerometer comprising;

a fixed support structure;

a movable mass having a movable portion and one or more bonding portions, said one or more bonding portions formed as one or more islands relative to said movable portion and coupled to said movable portion by one or more flexible arms, said one or more bonding portions adapted to enable rigid attachment of one or more electrical conductors thereto while providing mechanical isolation relative to said fixed support structure and said movable mass;

one or more flexures interconnecting said movable portion of said movable mass and said fixed support structure, said one or more flexures for enabling said movable mass to be movably attached to said fixed support structure, wherein said one or more flexible arms and said one or more bonding portions are formed on said movable mass and spaced away from said flexures;

a bonding pad formed on said one or more bonding portions;

an electrical conductor bonded to said bonding pad for electrically interconnecting said bonding pad to an external circuit; and means, coupled to said electrical conductor, for providing a signal representative or acceleration.

5. An accelerometer as recited in claim 4, wherein said one or more islands are formed by one or more slots in said movable portion.

6. An accelerometer as recited in claim 5, wherein said support structure and said movable mass are fabricated from quartz.

* * * * *